Dec. 12, 1950     H. F. JURGELEIT     2,533,468
INJECTION MOLDING UNIT
Filed March 26, 1947     2 Sheets-Sheet 1
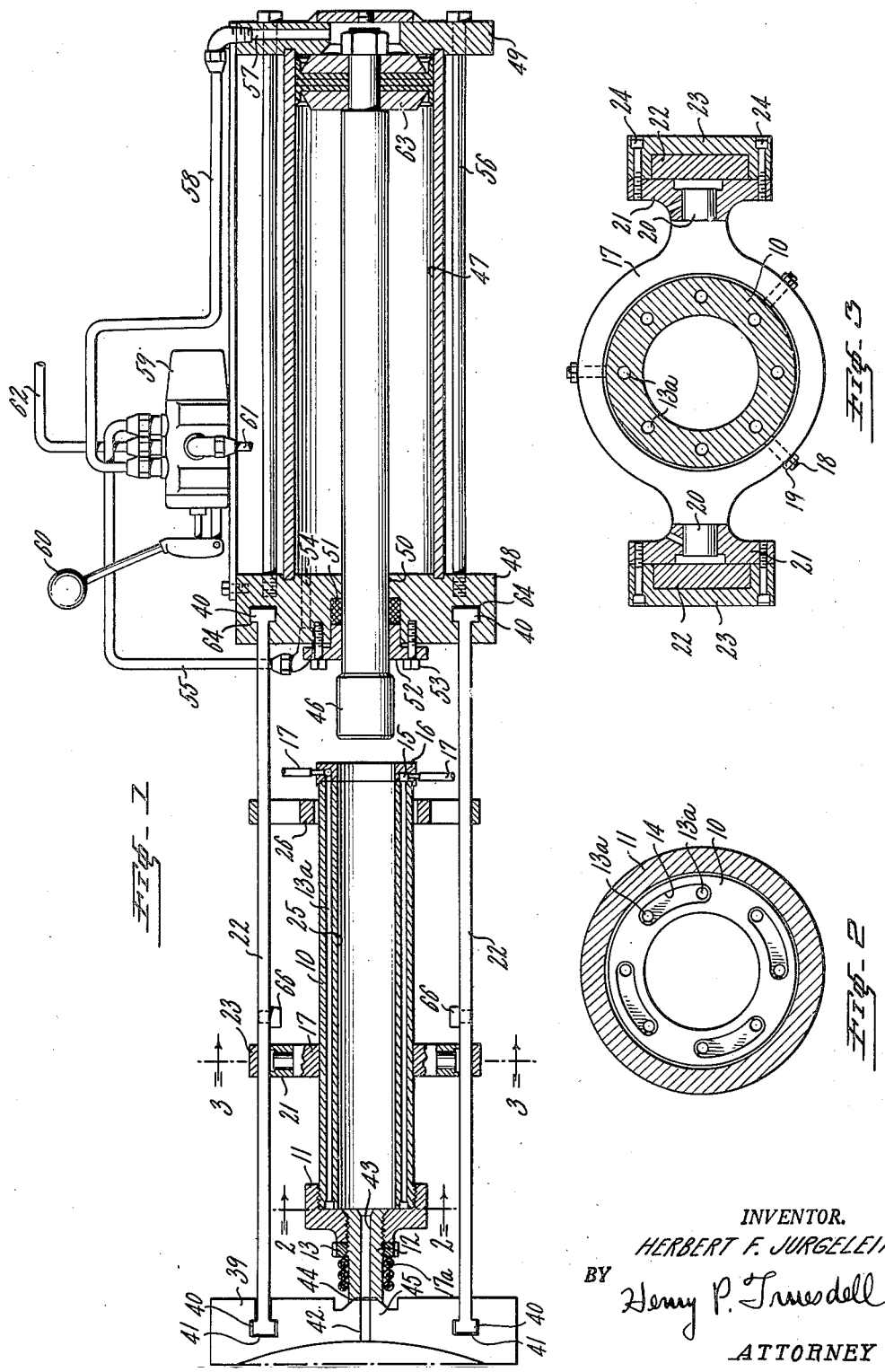
INVENTOR.
HERBERT F. JURGELEIT
BY Henry P. Truesdell
ATTORNEY

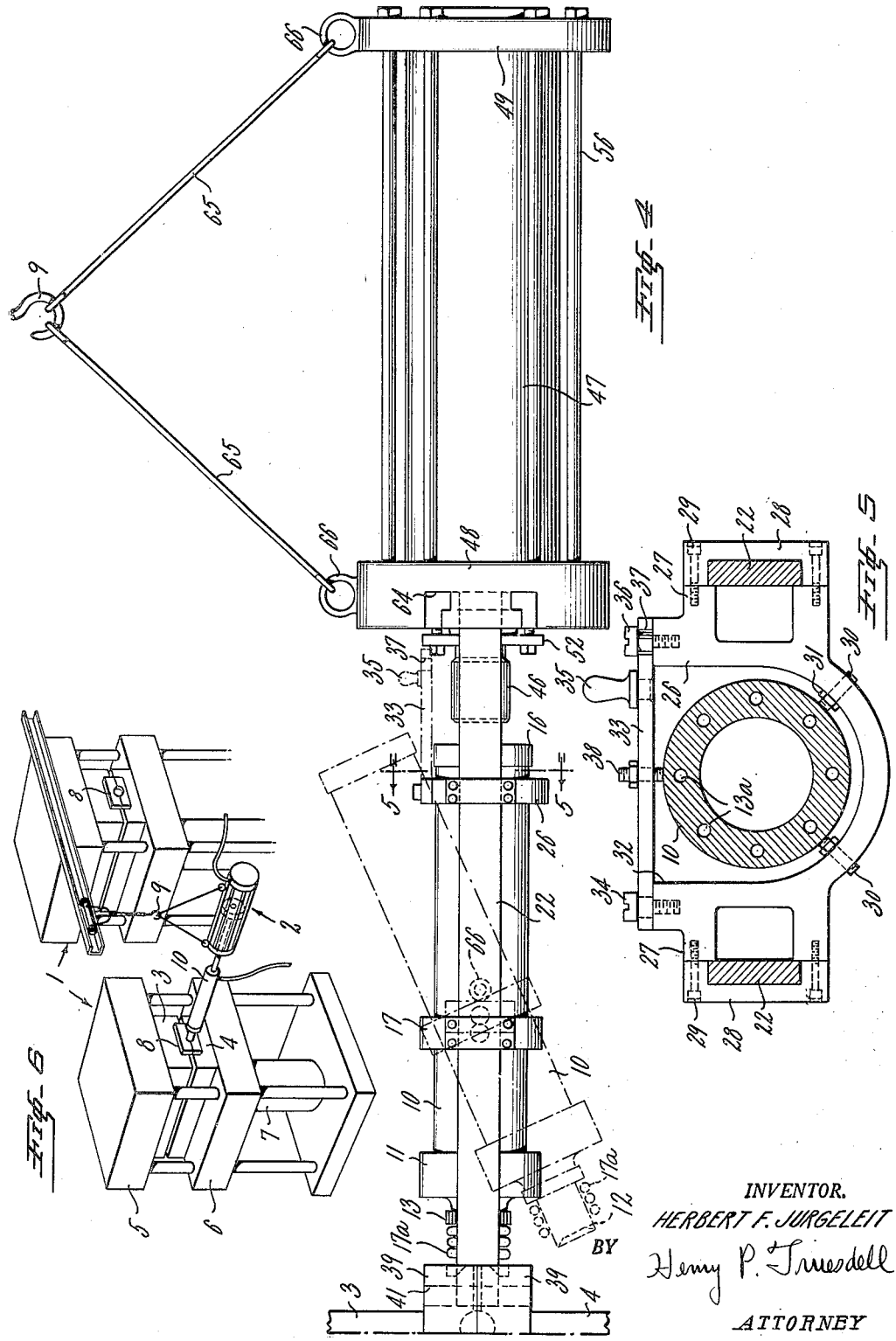

Patented Dec. 12, 1950

2,533,468

UNITED STATES PATENT OFFICE 2,533,468

INJECTION MOLDING UNIT

Herbert F. Jurgeleit, Oceanside, N. Y., assignor to United States Rubber Company, New York, N. Y., a corporation of New Jersey Application March 26, 1947, Serial No. 737,317

4 Claims. (Cl. 18—30)

My invention relates to an injection molding unit and more particularly to apparatus for injecting moldable material into a compression-type closed cavity mold.

In conventional compression-type molding equipment, it is customary to place a plurality of cavity molds on the heated platen of a press and then place a pellet or block of moldable material in each cavity; thereafter, the parts of the molds are pressed together and the material molded under heat and pressure. However, in molding large articles, for example, the steering wheel of an automobile, it is difficult, if not impossible, to place the molding compound uniformly into a large cavity of irregular shape. As an alternative, it is customary to injection mold such articles. This means that special injection molding apparatus is required with a resultant increase in cost of mold equipment which must be kept available. By my invention, however, it is possible to utilize the injection molding method with conventional compression-type equipment by using a portable and detachable injection molding unit applied to such presses. In other words, the injection unit is constructed and arranged as a separate device which may be moved from press to press, or from mold to mold in a single press, to inject moldable material into any chosen cavity mold. The arrangement is such that the injection molding unit may be quickly and easily attached to a particular mold or press without requiring any modification or change in the construction of the press. In this way, a compression-type press may be used in a normal manner to mold a plurality of articles by compressing the moldable material in the mold cavity or it may be used equally as well for making a product by injection molding, through the use of my injection molding unit in conjunction with the press.

Therefore, it is an object of my invention to provide a new and improved injection molding unit which is portable and which may be easily and quickly attached to a conventional compression-type press for injecting moldable material into a mold cavity.

In the accompanying drawing, Fig. 1 is a plan view in cross section showing an injection molding unit constructed in accordance with my invention;

Fig. 2 is a sectional view through part of the unit taken along the line 2—2 of Fig. 1;

Fig. 3 is another sectional view of the device taken along the line 3—3 of Fig. 1;

Fig. 4 is a view in elevation of the injection unit;

Fig. 5 is a sectional view taken along the line 5—5 of Fig. 4; and

Fig. 6 is a simplified schematic view showing the injection molding unit used in conjunction with a compression-type press.

Referring to the drawing, Fig. 6 shows a compression-type press 1 to which is connected an injection molding unit 2, constructed in accordance with my invention, and which is utilized to inject moldable material into the cavity of a mold having an upper part 3 and a lower part 4. The mold part 3 is carried by an upper fixed crosshead 5; the other half of the mold 4 is carried by a lower crosshead 6 which may be moved toward the upper crosshead by means of a hydraulic ram 7 to place the two parts of the mold under compression. The compression-type thus briefly described has been illustrated to show the manner in which my injection molding unit is connected to the press to serve its purpose. In normal operation of the press moldable material would be placed in the cavities of the lower mold part 4 and then the two parts of the mold would be pressed together to compress the moldable material and fill the cavities, the material being cured under heat and pressure. However, when it is desired to inject the moldable material into the mold cavity, my injection molding unit is employed, the unit being secured to the press by means of an adapter 8, (39) in a manner to be described in detail later. The unit 2 is supported in position in any convenient way as by a hoist 9; by mounting the hoist 9 on a traveller it is easily possible to move the injection unit from one press or mold to another.

Turning now to the detailed construction of the injection molding unit and referring to Fig. 1, the unit includes a cylinder 10 adapted to be loaded with moldable material such as rubber. One end of the cylinder is closed by a cover plate 11 which, in turn, supports a nozzle 12 secured to the cover plate by a lock nut 13. In order to heat the moldable material during the injecting operation, as well as reduce friction in the cylinder the wall of the cylinder is provided with a plurality of steam channels 13a. As shown in Fig. 2, these channels are interconnected at one end by means of manifold grooves 14; at the other end of the cylinder the channels are interconnected by grooves 15 in an end plate 16. Steam supply and return pipes 17 are connected to plate 16. While in the form of the invention illustrated, I prefer to utilize steam for heating the moldable compound during the molding operation it should be manifest that other forms of heating may be used such as electric heating units. It is desirable to provide a heater for the nozzle 12 to reduce friction in the nozzle and to cure the moldable compound for subsequent easy removal. To this end, an electric heating coil 17a is wrapped around the nozzle.

As shown most clearly in Fig. 3, the cylinder 10 is supported by a pivoted yoke 17 the position of the cylinder in the yoke being adjusted by means of set screws 18 held by lock nuts 19. The yoke itself is provided at opposite ends with trunnions 20 seated in bearing blocks 21 the blocks being supported on tie bars 22 by means of caps 23 fastened to the journal blocks by screws 24. As shown in Figs. 1 and 4, the yoke 17 carrying the cylinder may be moved along the tie bars 22 in a manner and for a purpose to be described later.

The yoke 17 is located at approximately the mid-point of the cylinder so that the cylinder may be pivoted about its transverse axis, as indicated in Fig. 4, to permit loading of the moldable material into an interior chamber 25 of the cylinder. In normal position, the end of the cylinder opposite the nozzle 12 rests in a cradle 26, best shown by Fig. 5. The cradle is provided with oppositely extending arms 27 which are adapted to engage and ride along the tie bars 22 being fastened thereto by means of caps 28 secured to the arms by screws 29. The final position of rest of the cylinder within the cradle 26 is determined by the adjusting screws 30 which are held in adjusted position by lock nuts 31. The cradle 26 is provided with an open recess 32 so that the cylinder may be pivoted into and out of the cradle. The open end of the recess is closed by means of a locking bar 33 pivoted to one side of the cradle, as indicated at 34, and which is provided with a handle 35 for swinging it into and out of closing position. In closed position the locking bar is retained by a screw 36 which engages with a slot 37 in the end of the bar. An adjustable screw 38 carried by the locking bar engages the upper surface of the cylinder 10 and holds it securely in position in the cradle.

As previously mentioned, an adapter 8 is utilized to attach the unit to the press. To this end, the two parts 3 and 4 of the mold are each provided with an adapter plate 39 best shown by Figs. 1 and 4. The ends of the tie bars 22 are provided with enlarged flanges 40 which fit into T-slots 41 formed in the adapter plates 39. Thus, in order to mount the injection unit on the press it is simply necessary to insert the ends 40 of the tie bars 22 in the T-slots 41 and move the unit into position. In order to provide a passageway for the molding material from the injection unit to the cavity in the molds, the adapter plates are provided with channels 42 which, when the cylinder is in horizontal position, are in alignment with a passageway 43 in the nozzle 12. To facilitate proper positioning of the cylinder and nozzle during the injecting operation the nozzle 12 is provided with a recessed end surface 44 which mates with a projection or nipple 45 formed on the two adapter plates 39. This assures a tight connection during the injecting operation so that there is no leakage of the moldable material at this point. Inasmuch as the yoke 17 is slidable along the tie bars 22 the nozzle may be moved into and out of engagement with the nipple 45.

Moldable material is compressed within the cylinder 10 by means of a piston 46 which travels in a cylinder 47 the cylinder being closed at opposite ends by means of cylinder heads 48 and 49, respectively. The piston 46 extends through an opening 50 in the cylinder head 48 the opening being sealed by packing material 51 held in place by a packing gland 52 the latter being fastened to the cylinder head by screws 53. In addition, the cylinder head 48 is provided with a channel 54 for a connection with a high pressure fluid line 55. The two cylinder heads 48 and 49 are retained in position on the ends of the cylinder 47 by means of tie rods 56 disposed around the outside circumference of the cylinder. Cylinder head 49 is likewise provided with a channel 57 for connection to a high pressure fluid supply line 58.

The two high pressure fluid supply lines 55 and 58 are connected to a control valve 59 having an operating handle 60 and which is connected to a source of high fluid pressure 61. A discharge line 62 is also connected to the valve 59. The piston 46 is connected to a piston head 63 which is adapted to move back and forth in the cylinder 47 as fluid under high pressure is applied to either side of the head. The control valve 59 is of a conventional construction and itself forms no part of the present invention; it is constructed so that fluid under high pressure may be applied to either side of the piston head 63 to move the piston 46 back and forth in the cylinder 10. It will be apparent that any suitable source of fluid pressure may be used, such as water, oil, or compressed air, and that any suitable working pressures may be used.

The piston 46, cylinder 47 and the associated control mechanism for moving the piston back and forth constitute what may be termed a pressure unit. This unit may be easily mounted on and disconnected from the tie rods 22 simply by inserting the flanged ends 40 of the tie rods in corresponding T-slots 64 in the cylinder head 48. The entire injection molding unit may be suspended by hooks 65 fastened at one end to eyelets 66 in the cylinder heads 48 and 49, and at the other ends to the hoist 9.

To operate the injection molding unit the tie bars 22 are first inserted in the slots 41 in the adapter plates 39 fastened to the cavity molds in the compression-type press and the unit is supported in balanced position by means of the hooks 65 and hoist 9. Locking bar 33 is pivoted to open position to permit the cylinder 10 to be tipped at an angle as shown in Fig. 4, so that a charge of rubber, or other suitable moldable material, may be inserted in chamber 25. Thereafter, the cylinder is returned to horizontal position and the locking bar 33 moved to lock the cylinder in position on the cradle 26. Fluid pressure is now applied to the piston 46 by suitable operation of the control handle 60. Fluid under high pressure passes through the supply line 58 to the rear of the piston head 63 and moves the head along the length of the cylinder 47. At the same time the piston 46 enters the chamber 25 in cylinder 10 and compresses the charge of moldable material. Due to the pressure on the charge of material and also because of the frictional engagement of the piston 46 with the inner side walls of the chamber 25, the entire cylinder 10 and the yoke 17 are moved along the tie rods 22 to a position such that the nozzle 12 engages and is centered on the nipple 45. Continued movement of the piston 46 compresses the charge of moldable material and forces it through the passageway 43 in the nozzle 12 into the channels 42 in the adapter plates and thence into the cavity in the mold. As the piston moves forward the nozzle is forced tightly into engagement with the nipple 45 so that a good seal is obtained between these parts preventing leakage of compound. In addition, the curved recessed surface 44 of the nozzle tends to force the two parts of the nipple 45 together preventing the compound from flashing out between the two adapter plates 39. After the mold cavity has been completely filled with material the latter is cured for a predetermined time by the heat supplied in the press 1.

The control valve 59 is then operated to withdraw the piston 46 from the cylinder 10. To accomplish this, high pressure fluid is admitted to the cylinder 47 through the supply line 55 and channel 54, the fluid at the opposite side of the cylinder head discharging through line 58 and the discharge line 62. In this way the piston 46 is completely retracted permitting reloading of the chamber 25 with a fresh charge. As the piston 46 is moved backward under fluid pressure the frictional engagement between it and the chamber 25 causes the cylinder 10 and yoke 17 to slide backward along the tie rods 22 to a position such that the yoke 17 engages stops 66 located on the tie rods 22. These stops limit the retractive movement of the cylinder 10 and hold it in position so that the piston 46 may be completely withdrawn. This backward movement of the cylinder 10 removes the nozzle 12 from engagement with the nipple 45 so that the cylinder 10 may be tipped for insertion of a new charge of moldable material.

My injection molding unit is one which can be easily connected to a conventional compression-type press for injecting moldable material without requiring any modification in the present structure other than the provision of the adapter plates for connecting the unit. The device is portable and can be easily moved from one press or mold to another. By pivoting the cylinder 10 on the tie rods 22 loading of the cylinder is easily accomplished. At the same time, this arrangement makes it possible to reduce the overall length of the unit considerably.

Having thus described my invention, what I claim and desire to protect by Letters Patent is:

1. An injection molding unit comprising, in combination, spaced supporting bars adapted to be connected to a molding device, a member slidable along said bars, a cylinder pivotally supported on said member for movement about a transverse axis of the cylinder, a piston cooperating with said cylinder for extruding moldable material therefrom and means for moving the piston into the cylinder and retracting it therefrom whereby the cylinder may be pivoted out of the path of the piston for loading with moldable material.

2. A unit for injecting molding compound comprising, in combination, a mold having a cavity, spaced guide bars, a member slidable along said bars, a cylinder carried by said member and adapted to hold a charge of compound, said cylinder being provided with a nozzle, a piston cooperating with the cylinder for compressing the charge to extrude the compound through said nozzle and means for moving the piston into said cylinder to compress the charge and move the member along the lengths of the guide bars whereby the nozzle is positioned adjacent the cavity, said guide bars being detachably fastened directly to said mold.

3. A unit for injecting molding compound into a cavity comprising, in combination, a support, a cylinder adapted to hold a charge of compound, said cylinder being provided with an orifice for extruding the compound, a piston cooperating with said cylinder for compressing the charge therein, fluid pressure means for operating said piston, and means slidable along the length of said support for pivotally mounting the cylinder on said support for movement about a transverse axis of the cylinder out the plane of the piston whereby the cylinder may be charged with compound, said piston also cooperating with said cylinder for moving said last mentioned means and cylinder along said support to position the orifice against the cavity.

4. A unit for injecting molding compound into a cavity comprising, in combination, a supporting structure, a cylinder adapted to hold a charge of compound, said cylinder being provided with an orifice for extruding the compound, a piston cooperating with said cylinder for compressing the charge therein, fluid pressure means for operating said piston, means for pivotally mounting the cylinder on said structure for movement about a transverse axis of the cylinder out of the plane of the piston whereby the cylinder may be charged with compound, and a cradle carried by the supporting structure for holding the cylinder in position for cooperation with said piston, said cradle being slidable along said supporting structure.

HERBERT F. JURGELEIT.

REFERENCES CITED

The following references are of record in the file of this patent:

UNITED STATES PATENTS

| Number | Name | Date |
|---|---|---|
| Re. 18,202 | Polak | Sept. 22, 1931 |
| 1,262,628 | Bradley | Apr. 16, 1918 |
| 2,112,342 | Lester | Mar. 29, 1938 |
| 2,293,304 | Muller et al. | Aug. 18, 1942 |
| 2,358,857 | Gits | Sept. 26, 1944 |
| 2,374,468 | Von Opel | Apr. 24, 1945 |

FOREIGN PATENTS

| Number | Country | Date |
|---|---|---|
| 23,711 | Great Britain | Dec. 9, 1893 |
| 645,093 | France | Oct. 19, 1928 |